(12) United States Patent
Hsieh

(10) Patent No.: US 7,685,359 B2
(45) Date of Patent: Mar. 23, 2010

(54) METHOD OF SETTING A STORAGE DEVICE

(75) Inventor: Hsiang-An Hsieh, Sindian (TW)

(73) Assignee: Carry Computer Eng. Co., Ltd., Taipei County (TW)

( * ) Notice: Subject to any disclaimer, the term of this patent is extended or adjusted under 35 U.S.C. 154(b) by 982 days.

(21) Appl. No.: 11/406,310

(22) Filed: Apr. 19, 2006

(65) Prior Publication Data

US 2007/0198801 A1 Aug. 23, 2007

(30) Foreign Application Priority Data

Feb. 17, 2006 (TW) ............................... 95105550 A

(51) Int. Cl.
*G06F 12/00* (2006.01)
*G06F 13/00* (2006.01)
*G06F 13/28* (2006.01)

(52) U.S. Cl. ...................................... 711/112; 711/154

(58) Field of Classification Search ....................... None
See application file for complete search history.

(56) References Cited

U.S. PATENT DOCUMENTS

2002/0110058 A1* 8/2002 Hamada et al. .......... 369/47.13
2006/0047924 A1* 3/2006 Aoshima et al. ............. 711/161

* cited by examiner

*Primary Examiner*—Matt Kim
*Assistant Examiner*—Matthew R Chrzanowski
(74) *Attorney, Agent, or Firm*—Rosenberg, Klein & Lee

(57) ABSTRACT

A method of setting a storage device that a storage management program is built in an application system is used to set a disk label of the storage device and without specially developed application program is set between the application system and the storage device. Some command codes are set as default in the storage device to detect whether the disk label of the storage device is set by the application system includes command codes or not to execute operations are set by the command codes so as to operate the storage device.

10 Claims, 5 Drawing Sheets

METHOD OF SETTING A STORAGE DEVICE

BACKGROUND OF THE INVENTION

1. Field of the Invention

The present invention relates to a storage device, and more particularly to a method of setting the storage device.

2. Description of the Prior Art

Recently with the rapidly development of portable storage device, the attached functions of the storage device are also diverse. In order to provide the attached functions are set by the users, it is common that the users install a specially developed application program in an application system such as the personal computer, and operation interfaces such as keyboards and monitors of the application system are used to set the attached functions of the portable storage device.

However, the application programs have to be separately developed according to different operation system so that the attached functions are limited, and the application programs have to be stored in the storage device or other storage media are used to store the application programs of the storage device.

The inventor of the present invention recognizes the above shortage should be corrected and special effort has been paid to research this field. The present invention is presented with reasonable design and good effect to resolve the above problems.

SUMMARY OF THE INVENTION

An object of the present invention is to provide a disk label of a storage device is used to provide operations of inputting setting values, switching or selecting the functions of storage device and without specially developed application program is set between an application system and the storage device so that the users directly set the functions by modifying the disk label so as to input the setting values to the storage device.

For achieving the objective stated above, the present invention provides a method of setting the storage device. Firstly, the application system sets the disk label to the storage device, and next the storage device determines whether the disk label is changed or not: if "true" and then determines whether the disk label comprises a command code or not: if "true" and then recognizes the command code; if "false" and then returns to a general data access. Finally, the storage device executes a function of the storage device is set by the disk label according to the disk label with the command code.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
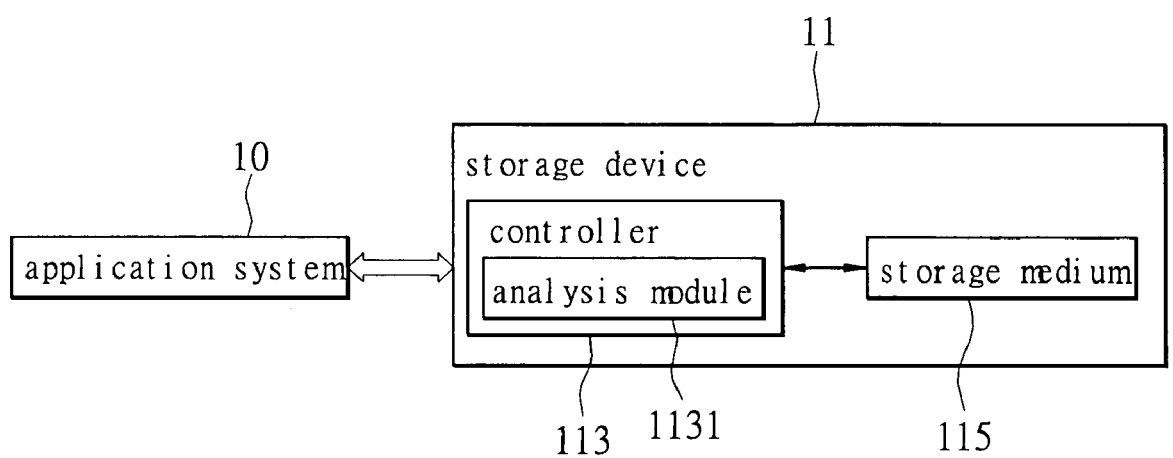
FIG. 1 is a function block diagram of a storage device of the present invention.

Reference is made to FIG. 1 which is a function block diagram of a storage device of the present invention. A controller 113 of the storage device 11 has an analysis module 1131 for reading a medium 115, recognizing a file system, searching a disk label etc. so as to record contents and storage addresses of the disk label after finding the disk label. That is, when an application system 10 executes a writing operation, the controller 113 checks whether the disk label is changed or not. If the disk label changed, the controller 113 researches the disk label after the application system 10 finishes the writing operation, and records the contents and storage addresses of the disk label after the controller 113 finds the disk label.

The controller 113 is used to record a property of the disk label of the storage device 11 is set by the user so that the user inputs setting values to the storage device 11 by setting the disk label. And in order to distinguish the setting values of the storage device 11 and a disk name of the general disk label, a prefix code represents a command code and follow-up words are the parameter of the command code.

For example, if the users want to input the password to the storage device 11, the command code can be "PWD", and the users input only "PWDn$_1$n$_2$n$_3$n$_4$" that the controller 113 recognizes that the disk label has the command code "PWD" to regard "n$_1$n$_2$n$_3$n$_4$" as the parameter values, that is password. Moreover, in order to accomplish the password identification, it needs to distinguish different command codes such as "PWS" for setting password and "PWD" for checking password.

If the users need to adjust a language family for the disk label, the command code is "LANG", and some parameter values of the language family are set as default. For example, "CNT" means Chinese traditional, "CNS" means Chinese simplified, "JPN" means Japanese and "KRN" means Korean etc. Hence, when the users input "LANGCNT", that means the storage device 11 is set in Chinese traditional; when the users input "LANGJPN", that means the storage device 11 is set in Japanese.

Besides, the storage device 11 retains a most-significant command code, and the storage device 11 enables or disables the function of the command code of the disk label so that the users set the disk label without limitation of the command code set as default. For example, "LBLCMDOFF" means the command code of the disk label is disabled to set the storage device 11. And any command code can't enable the function of the command code of the disk label once again except the command code "LBLCMDON".

In addition, the controller 113 requires to retain a block in the storage medium 115 for recording a function option so as that the controller 113 reads the function option recorded in the storage medium 115 to immediately enter the desired operation mode after the users restart the application system.

Figure 2:
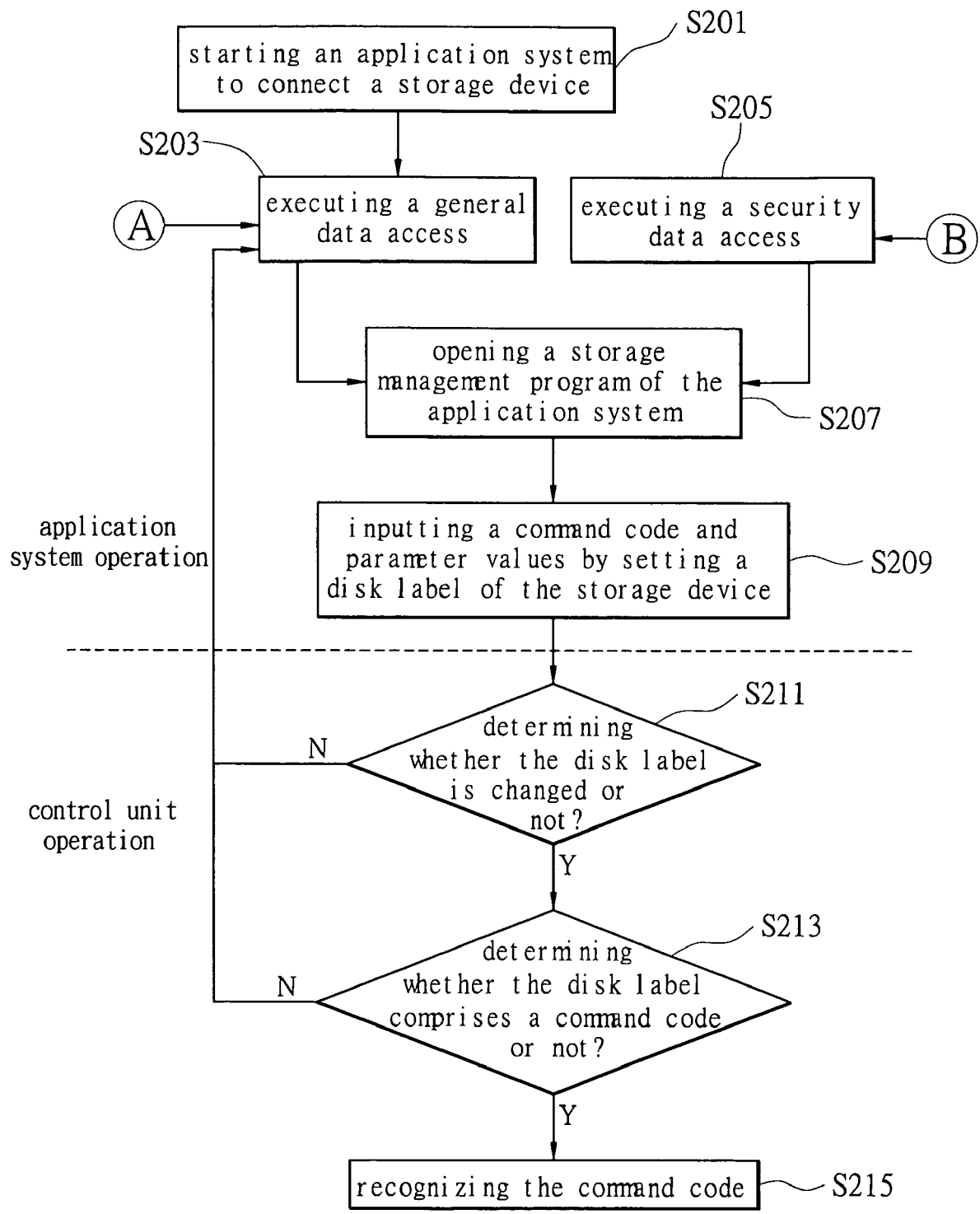
FIG. 2 is a flow chart of setting the storage device of the present invention.

Reference is made to FIG. 2 which is a flow chart of setting the storage device of the present invention. Firstly, starting the application system to connect the storage device (at step S201), and next executing a general data access between the application system and the storage device (at step S203), and next opening a storage management program of the application system (at step S207), wherein the storage management program is built in a general application system for setting the disk label of the storage device. And next setting the disk label of the storage device by the storage management program and inputting the command code and the parameter values (at step S209), and next recording the disk label and determining whether the disk label is changed or not by the controller of the storage device (at step S211): if "false" and then returns to step S203; if "true" and then determines whether the disk label comprises a command code or not (at step S213): if "false" and then returns to step S203; if "true" and then recognizes the command code that is which kind of command code (at step S215).

Figure 2A:
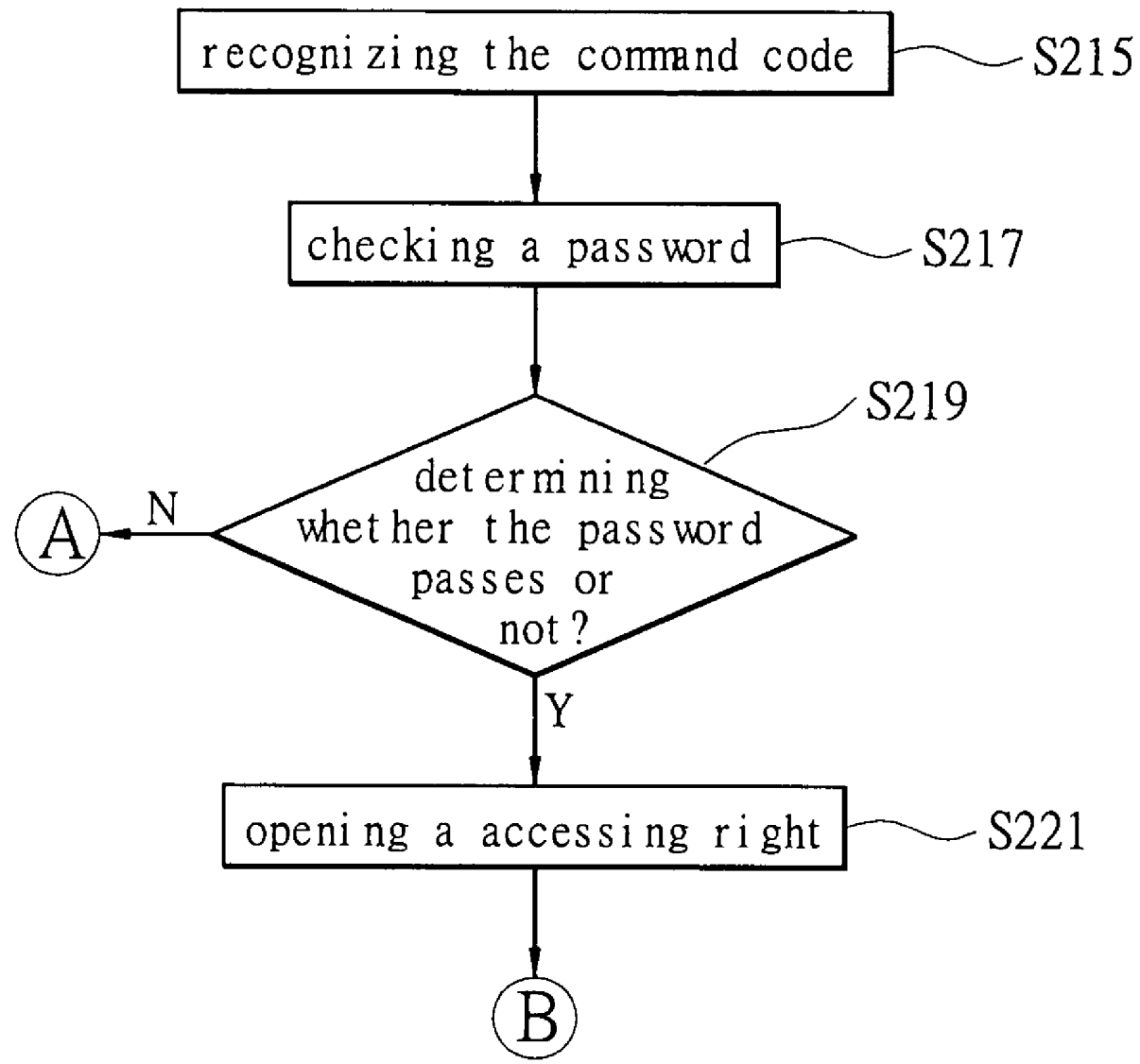
FIG. 2A is a flow chart of the first preferred embodiment of the present invention.

Reference is made to FIG. 2A which is a flow chart of the first preferred embodiment of the present invention. If the prefix of entered disk label is recognized as the command code of checking password and then checks the password (at step S217). And next determining whether the password inputted passes or not (at step S219): if "false" and then returns to step S203 (shown in FIG. 2); if "true" and then the storage device opens a accessing right (at step S221) and returns to step S205 to execute a security data access.

Figure 2B:
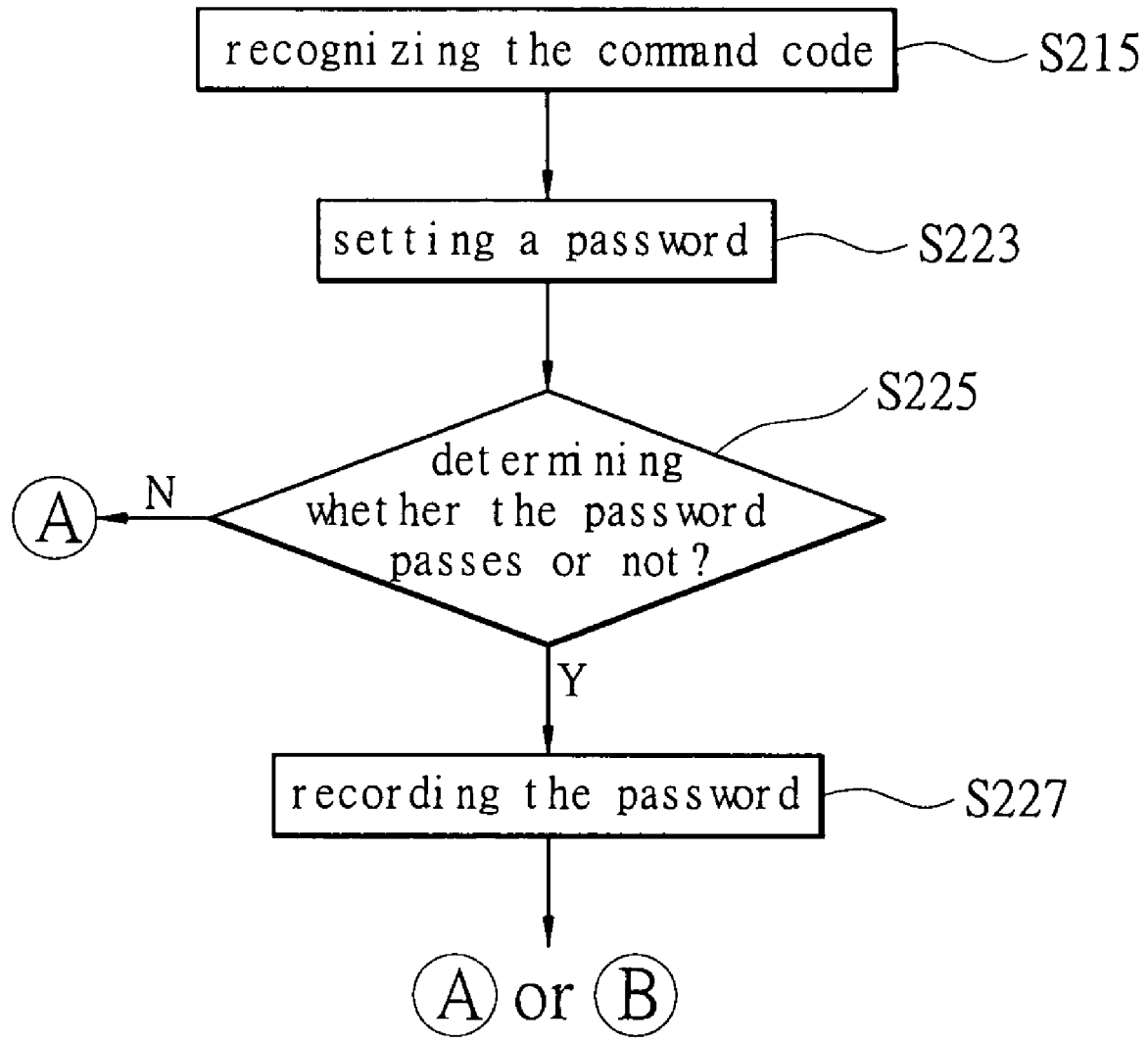
FIG. 2B is a flow chart of the second preferred embodiment of the present invention.

Reference is made to FIG. 2B which is a flow chart of the second preferred embodiment of the present invention. If the prefix of entered disk label is recognized as the command code of setting password at step S215 and then sets the password (at step S223). And next determining whether the password set passes or not (at step S225): if "false" and then returns to step S203 (shown in FIG. 2); if "true" and then records the password inputted in the storage device (at step S227) and returns to step S205 or step S203 (shown in FIG. 2).

Figure 2C:
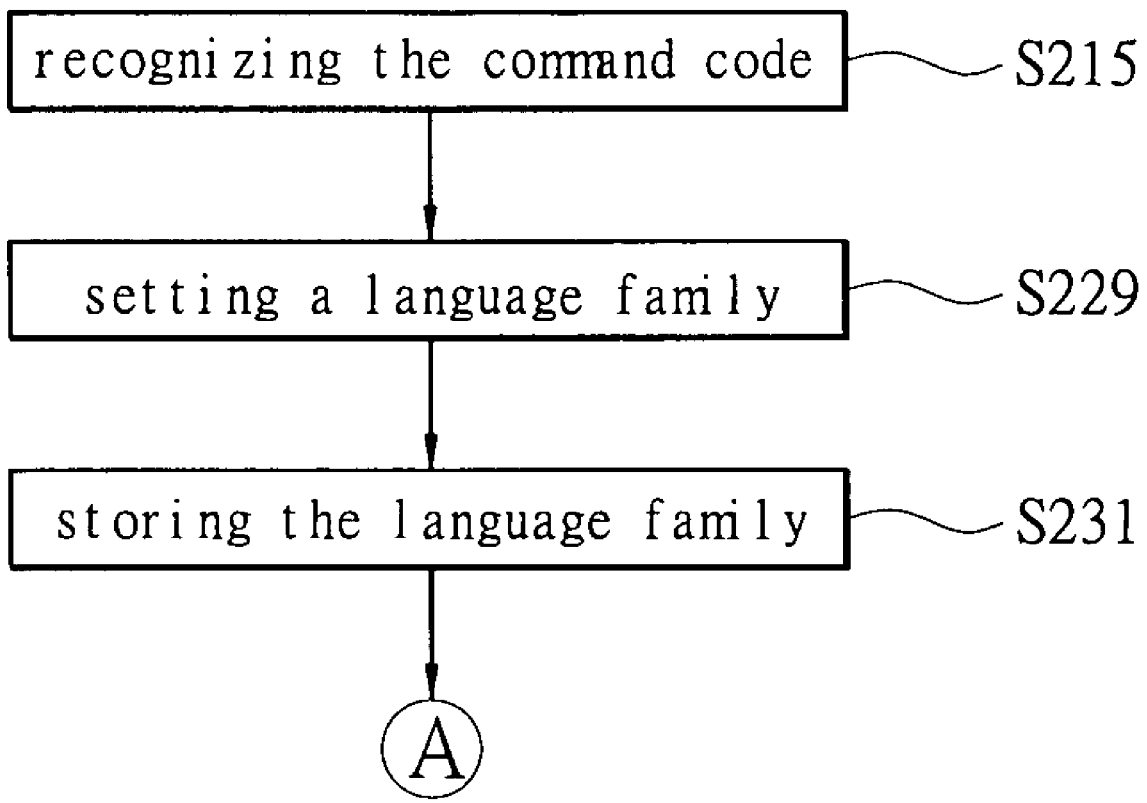
FIG. 2C is a flow chart of the third preferred embodiment of the present invention.

Reference is made to FIG. 2C which is a flow chart of the third preferred embodiment of the present invention. If the prefix of entered disk label is recognized as the command code of setting language family at step S215 and then sets the language family (at step S229). And next stores the language family set in the storage device (at step S231) and returns to step S203 (shown in FIG. 2).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of setting a storage device, comprising the steps of:
   setting a disk label by an application system to a storage device;
   determining whether the disk label changed or not by the storage device;
   determining whether the disk label has a command code or not if the disk label is changed;
   recognizing the command code if the disk label has the command code; and
   executing a function of the storage device set by the disk label according to the command code by the storage device.

2. The method of setting a storage device as in claim 1, wherein the disk label further comprises parameter values of the command code.

3. The method of setting a storage device as in claim 2, wherein if the command code is the command code of a checking password for checking a password of the storage device, and then the storage device executes the function of the storage device set by the disk label according to the command code, further comprising the steps of:
   inputting an authenticating password of the storage device according to the command code and the parameter values of the checking password;
   determining whether the password inputted by the parameter values of the checking password passes the authenticating password of the storage device or not; and
   opening an access right of the storage device for executing a security data access if the password inputted passes the authenticating password of the storage device.

4. The method of setting a storage device as in claim 2, wherein if the command code is the command code of a setting password for setting a password of the storage device, and then the storage device executes the function of the storage device set by the disk label according to the command code, further comprising the steps of:
   setting the password of the storage device according to the command code of the setting password and the parameter values of the password;
   recording the password set by the parameter values of the password; and
   executing a security data access between the application system and the storage device.

5. The method of setting a storage device as in claim 4, wherein the password set by the parameter values of the password is recorded in a storage medium of the storage device.

6. The method of selling a storage device as in claim 4, further comprising a step of checking the password, wherein the password set by the parameter values of the password is recorded while passing a checking password procedure.

7. The method of setting a storage device as in claim 2, wherein if the command code is the command code of a setting language family for setting a language family of the storage device, and then storage device executed the function of the storage device set by the disk label according to the command code, further comprising the steps of:
   setting the language family of the storage device according to the command code and parameter values of the setting language family;
   storing a language family set; and
   executing a general data access between the storage device and the application system.

8. The method of setting a storage device as in claim 7, wherein the language family set is recorded in a storage medium of the storage device.

9. The method of setting a storage device as in claim 2, wherein if the command code is the command code of a switching command code that is a most-significant command code reserved in the storage device, and then the storage device enables or disables the function of the command code of the disk label according to the command code of the switching command code.

10. The method of setting a storage device as in claim 1, wherein the disk label is set by a storage management program of the application system.

* * * * *